US012781496B2

(12) United States Patent
Dunning

(10) Patent No.: US 12,781,496 B2
(45) Date of Patent: Nov. 3, 2026

(54) CIP METAL ACTUATED DECK INSERT

(71) Applicant: BLACK & DECKER INC., New Britain, CT (US)

(72) Inventor: Jack Dunning, White Plains, NY (US)

(73) Assignee: BLACK & DECKER INC.

( * ) Notice: Subject to any disclaimer, the term of this patent is extended or adjusted under 35 U.S.C. 154(b) by 253 days.

(21) Appl. No.: 17/938,720

(22) Filed: Oct. 7, 2022

(65) Prior Publication Data

US 2024/0117626 A1 Apr. 11, 2024

(51) Int. Cl.
*E04B 1/41* (2006.01)
*F16B 19/10* (2006.01)

(52) U.S. Cl.
CPC ........ *E04B 1/4114* (2013.01); *F16B 19/1081* (2013.01)

(58) Field of Classification Search
CPC ........ E04B 1/4114; E04B 1/41; E04B 1/4121; F16B 19/1081; E04G 15/04
See application file for complete search history.

(56) References Cited

U.S. PATENT DOCUMENTS 2,199,271 A 4/1940 Schaefer
3,116,528 A * 1/1964 Poe ....................... F16B 21/075 411/15
3,606,814 A 9/1971 Mackenzie
3,798,866 A * 3/1974 Werstein ............... E04B 1/4121 52/707
3,896,599 A * 7/1975 Werstein ............... E04B 1/4157 52/39
4,118,910 A * 10/1978 McSherry ............. E04B 1/4121 52/704
4,405,272 A 9/1983 Wollar
4,757,664 A 7/1988 Freissle
5,729,948 A 3/1998 Levy et al.
5,850,676 A 12/1998 Takahashi et al.
6,206,200 B1 3/2001 Gilles et al.
6,481,942 B2 11/2002 Tanaka
(Continued)

FOREIGN PATENT DOCUMENTS

EP 3415699 A1 12/2018
JP S50123117 U 10/1975

OTHER PUBLICATIONS

European Search Report Dated Feb. 21, 2024, cited in corresponding EP Patent Application No. 23201576.8.
(Continued)

*Primary Examiner* — Andrew J Triggs
(74) *Attorney, Agent, or Firm* — Dickinson Wright PLLC

(57) ABSTRACT

A cast-in-place concrete anchor assembly for installation in or on a metal decking form. The assembly incudes an anchor housing with shaft extending from a flange. The flange includes a locking member that may take the form of a female thread. The anchor assembly also including an anchor support for receiving a shaft of the anchor housing. The anchor support further includes a radial expansion member with a tapered surface. The radial expansion member flexes outward upon engagement of the tapered surface by the shaft to expend the expansion member. The expansion member expanding outwardly past an outermost radius of a hole in the metal decking to lockably and selectively connect the assembly to the metal decking.

9 Claims, 10 Drawing Sheets

(56) References Cited

U.S. PATENT DOCUMENTS

| | | | | |
|---|---|---|---|---|
| 6,514,024 | B2 | 2/2003 | Akema et al. | |
| 6,726,417 | B2 | 4/2004 | Kanie | |
| 7,093,400 | B1 * | 8/2006 | Thompson | E04B 9/18<br>52/704 |
| 8,123,043 | B2 | 2/2012 | McGregor et al. | |
| 8,267,628 | B2 * | 9/2012 | Noce | E04B 5/40<br>411/80.6 |
| 8,347,465 | B2 | 1/2013 | Arisaka | |
| 8,419,330 | B2 | 4/2013 | Watanabe | |
| 9,011,058 | B2 | 4/2015 | Busch et al. | |
| 9,016,993 | B2 | 4/2015 | Watanabe et al. | |
| 9,631,653 | B2 | 4/2017 | Flynn et al. | |
| 9,982,700 | B2 | 5/2018 | Najima | |
| 10,851,540 | B2 * | 12/2020 | Espinosa | E04B 1/4128 |
| 11,401,708 | B2 * | 8/2022 | Espinosa | E04B 1/4121 |
| 2005/0123372 | A1 | 6/2005 | Sato | |
| 2021/0123238 | A1 | 4/2021 | Simek et al. | |
| 2024/0117585 | A1 * | 4/2024 | Dunning | E04B 1/4121 |
| 2024/0117626 | A1 * | 4/2024 | Dunning | E04B 1/4114 |

OTHER PUBLICATIONS

EP Communication pursuant to Article 94(3) EPC, Appl No. 23 201 576.8, dated Jun. 26, 2026.

* cited by examiner

CIP METAL ACTUATED DECK INSERT

BACKGROUND OF THE INVENTION

Cast-in-place (CIP) anchors are used to connect external loads to concrete structures. The anchor is connected (e.g., by encasement) securely to a concrete structure of a building (e.g., a concrete wall, concrete slab, concrete floor, column, etc.) and a load is connected (e.g., by suspension) to the anchor. For example, an anchor may be secured to a second-floor slab that serves as the roof of the first floor of a building. The anchor is secured to a lower portion of the slab and may include a connector positioned or located at or in proximity to the lower boundary of the slab. The connector may be a female thread for receiving a threaded rod on which the external load may be supported. Therefore, from the first floor below the slab, the threaded rod may be inserted or installed up into the female thread and utilities such as mechanical, electrical, or plumbing equipment may be supported (e.g., suspended) from the second-floor slab.

Cast-in-place anchors are placed/positioned within the concrete form work before pouring of the concrete. Concrete is then poured over/around the anchors and the anchors encased in the concrete. The load connector of the anchor (e.g., female thread) is positioned adjacent the concrete form boundary so that after concrete curing, the connector is readily accessible at or near the concrete boundary (e.g., after form work is removed).

In the case of a slab poured using metal decking, the metal decking is laid out horizontally and sufficiently supported thereunder before receiving the concrete pour. A hole is made (e.g., drilled) in a lower floor of the metal decking. An anchor assembly including an anchor housing and an anchor support is then positioned (e.g. by insertion) in the hole with a connector (e.g., female thread) directed at or passing through the hole. Concrete is then poured onto the decking encasing the anchor and fixing its position such that the female thread is readily exposed at or near the slab boundary.

Usually, a metal decking CIP anchor includes a metal anchor housing and a plastic anchor support. The anchor support includes a deck flange for engaging a top surface of the metal decking around the hole in the decking and the deck flange may be secured to the decking (e.g., by screws). The portion of the anchor/anchor support that passes through the decking to the lower side of the decking may include an expansion member that collapses as it is passed through the hole and then automatically re-expands radially after passing through the hole. That radial expansion of the expansion member secures the anchor to the metal decking along with the screws to prevent the anchor from being accidentally removed or dislodged from hole during construction.

In conventional anchors, the expansion of the above mentioned expansion member is automatic and such expansion is not selectable or reversable. Therefore, after pushing a conventional anchor through the decking hole and expanding the expansion member, it is difficult to remove the anchor from the hole should a change in position of the anchor be desired. A worker may have to spend precious time going to the lower floor to gain access to engage the expanded expansion member in order to remove it. Furthermore, if many anchors are already installed in the metal decking it would not necessarily be easy to determine precisely from the underside of the decking which anchor needs removal.

It would be beneficial to develop an anchor system in which the anchor could be adequately secured to the metal decking from the opposite side of the decking while at the same time the opposite side securement be selectively activated and reversible. Specifically, it would be beneficial if the opposite side expansion member could be selectively reversed so that the anchor could be easily removed should repositioning of the anchor on the metal decking be necessary or desired.

SUMMARY OF THE INVENTION

The present invention discloses a cast-in-place concrete anchor assembly connectable to a hole in concrete metal decking. When encased in concrete, the assembly may support an external load from the concrete structure. The assembly may include an anchor housing and an anchor support. The anchor housing may include an external load bearing flange (for encasement in concrete) and a shaft extending therefrom. The shaft including a connection member from which an external load may be connected to the cast-in-place concrete anchor. The anchor support may include a receptacle for telescopically receive the anchor housing therein and the anchor support may include a deck support flange and a radial expansion member. Actuation of the radial expansion member occurring as a result of the shaft of the anchor housing engaging the expansion member during the telescopic receiving to lock the assembly to the hole by trapping the hole between the base support flange and the expansion member.

The present application further discloses a method of installing a cast-in-place anchor in a hole in concrete metal decking for supporting an external load from a concrete structure formed on the metal decking. The method includes the step of providing an anchor housing. The anchor housing includes a load bearing flange and a shaft extending from the flange. The anchor housing further including a connection member in or on the shaft from which the external load may be connected to the cast-in-place concrete anchor. The method also includes the step of providing an anchor support. The anchor support includes a flange and a radially expandable member. The method further includes the step of telescopically inserting the anchor housing into the anchor support and into engagement with the radially expandable member until the radially expandable member is radially expanded to be larger than a radius of the hole.

DETAILED DESCRIPTION OF THE INVENTION

Figure 1A:
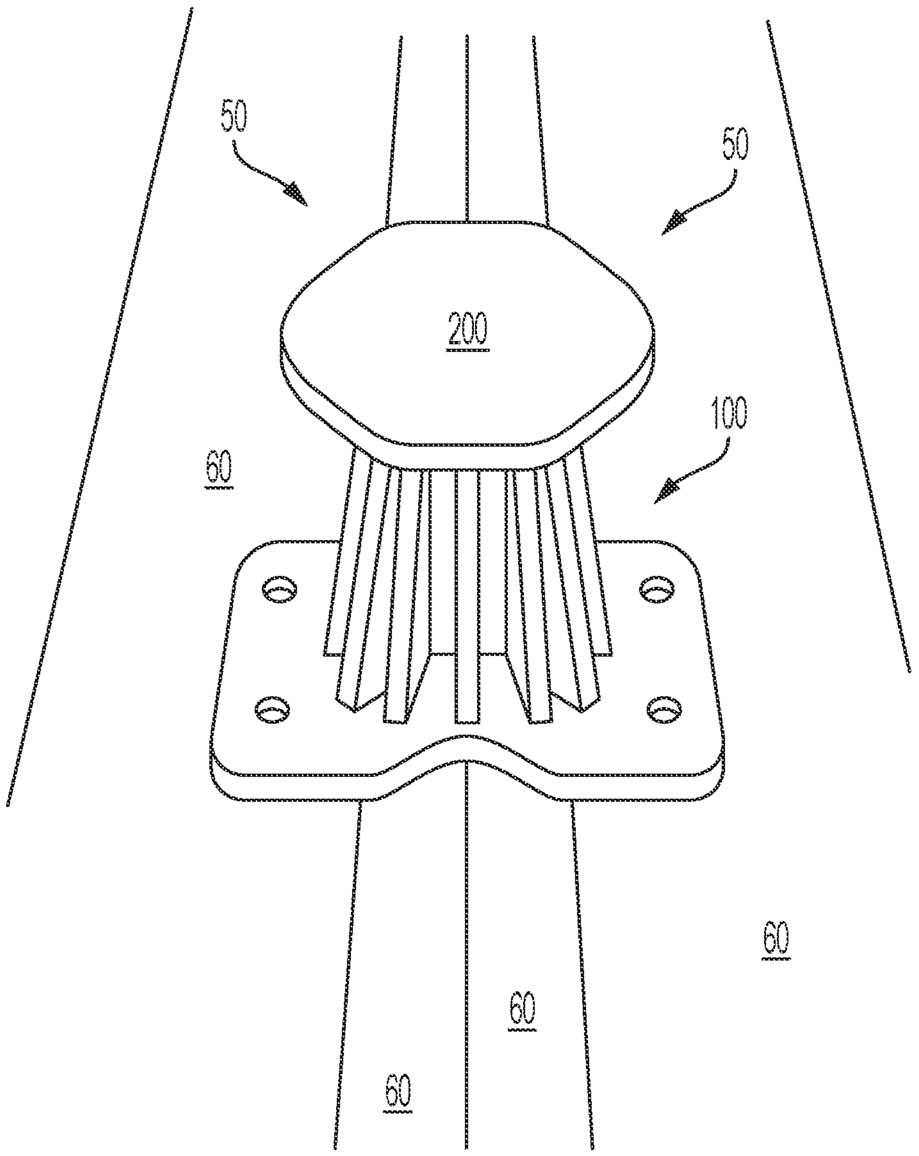
FIG. 1A shows a top perspective view of a first embodiment of an anchor support of the present invention installed in metal decking.
Figure 1B:
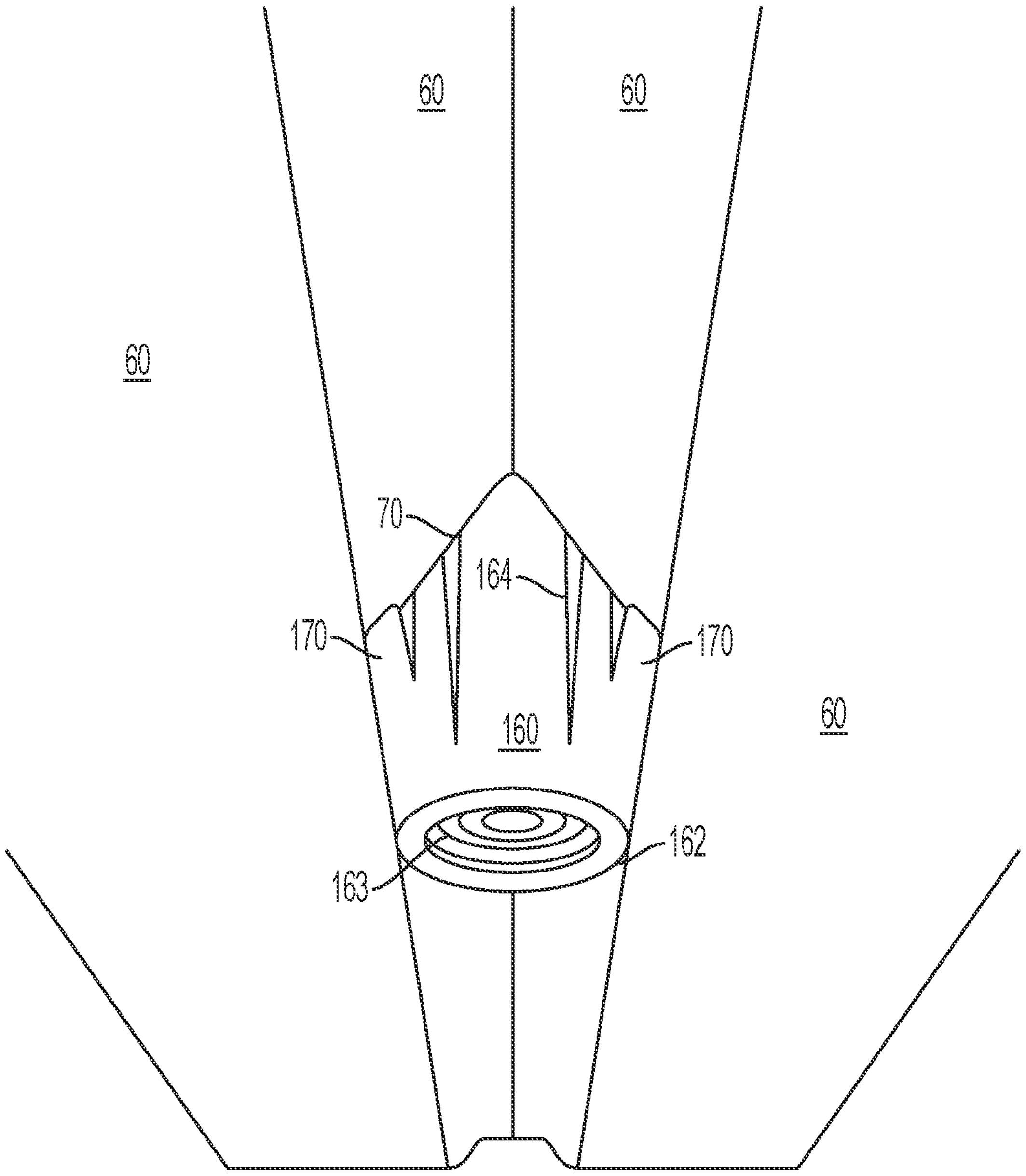
FIG. 1B shows a bottom perspective view of the anchor assembly of FIG. 1A installed in the metal decking.

FIGS. 1A-1M show a first embodiment of an inventive anchor assembly 50 including an anchor support 100, an anchor housing 200 and a passage extension 300. In particular, FIG. 1A shows a top perspective view of the anchor assembly 50 of the present invention installed on a top surface of concrete slab metal decking 60. Specifically, an anchor 100 is shown having received an anchor housing 200 therein. Furthermore, FIG. 1B shows a lower perspective view of a bottom portion 160 of anchor support 100 as it has been passed through an opening or hole 70 in metal decking 60. The presence of lower portion 160 on the lower side of metal decking 60 also presents an inside surface 163 of lower portion 160 which may include a locking member such as a female thread.

Figure 1C:
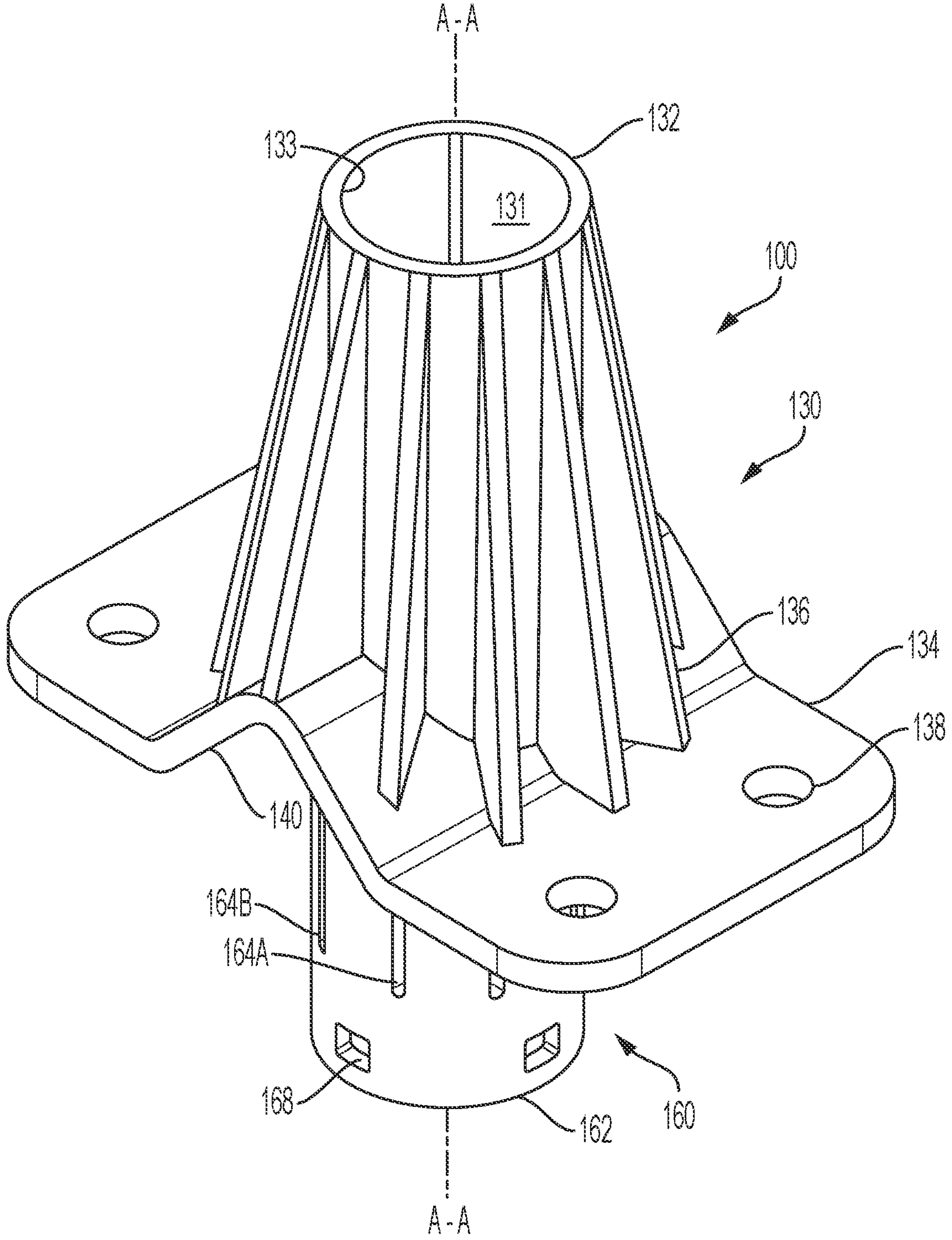
FIG. 1C shows a top perspective view of a first embodiment of the anchor support of FIG. 1A.

FIG. 1C is a top perspective view of the anchor support 100. Anchor support 100 may be made from plastic or other relatively inexpensive moldable material. As mentioned above, anchor support 100 may include an upper portion 130 and a lower portion 160. A flange 134 is disposed between the upper portion 130 and the lower portion 160. A longitudinal center line A-A passes through a longitudinal center of anchor assembly 50, anchor housing 200 and anchor support 100. Upper portion 130 includes a wall 132 which defines a receptacle 133. Upper portion 130 may also include one or more support ribs 136 for connected to and between wall 132 and flange 134 to strengthen and maintain the relative position between wall 132 and flange 134 under any contrary load.

Flange 134 may include openings (e.g., through holes) in the longitudinal direction for securing the flange 134 to a top surface of metal decking 60. Flange 134 may also include a shaped or non-planar portion 140 (e.g., shaped recess or shaped projection) for accommodating a correspondingly shaped or non-planar portion of the metal decking while allowing the remainder of flange 134 to rest on metal decking 60 in a plane generally perpendicular to longitudinal axis A-A. Shaped portion 140 may be shaped to accommodate a regularly occurring pattern in a particular decking design frequently encountered by an installer. For example, if a ridge exists in the sheeting to avoid bending or a ridge exists where tow sheets overlap, it may be desirable to have a flange 134 capable of accommodating the ridge should the anchor need to be placed in proximity to the ridge.

Figure 1D:
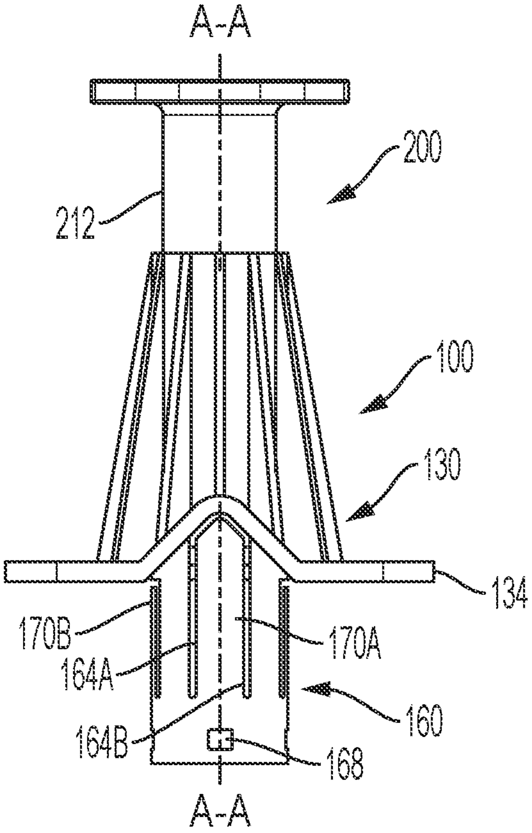
FIG. 1D shows a first side view of the anchor support of FIG. 1A.
Figure 1E:
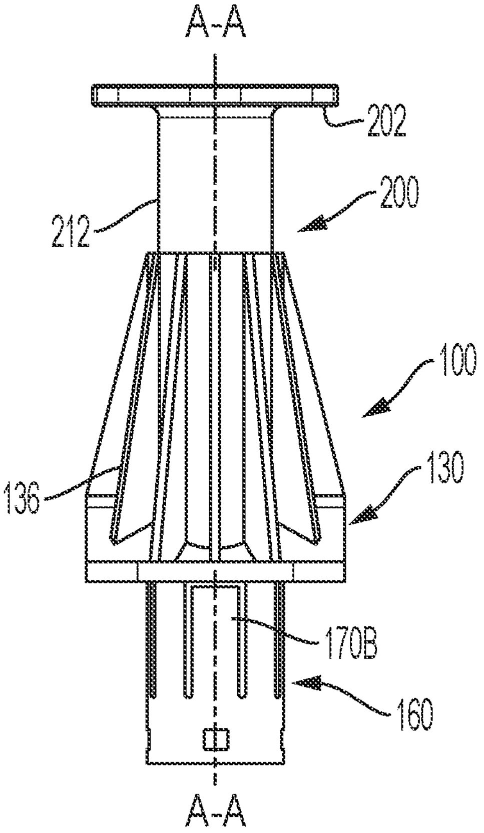
FIG. 1E shows a second side view of the anchor support of FIG. 1A.
Figure 1F:
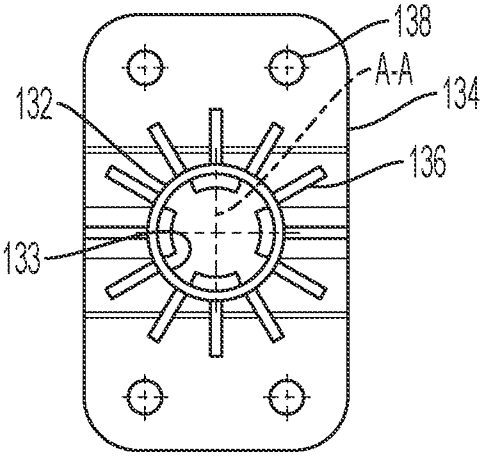
FIG. 1F shows a top view of the anchor support of FIG. 1A.
Figure 1G:
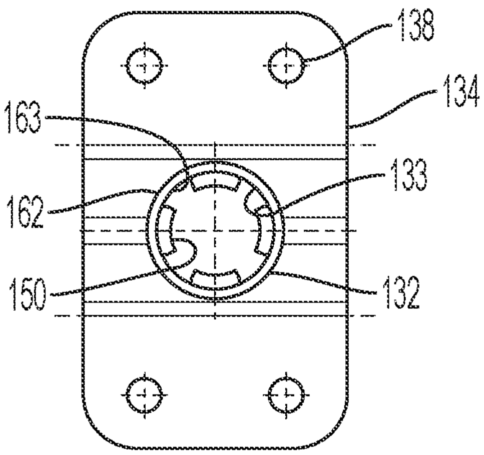
FIG. 1G shows a bottom view of the anchor support of FIG. 1A.

Lower portion 160 of anchor support 100 may also include a wall 162 and a recess 163 (see FIG. 1G). A radius of an outer portion of wall 162 is slightly smaller than a hole created in the metal decking through which lower portion 160 is inserted. Lower portion 160 may also include connectors 168 that may take the form of through holes or recesses. Through hole connectors may serve as receptacles for projections connected to other structures forming aspects of anchor assembly 50 (e.g., passage extensions) and described further below.

Figure 1H:
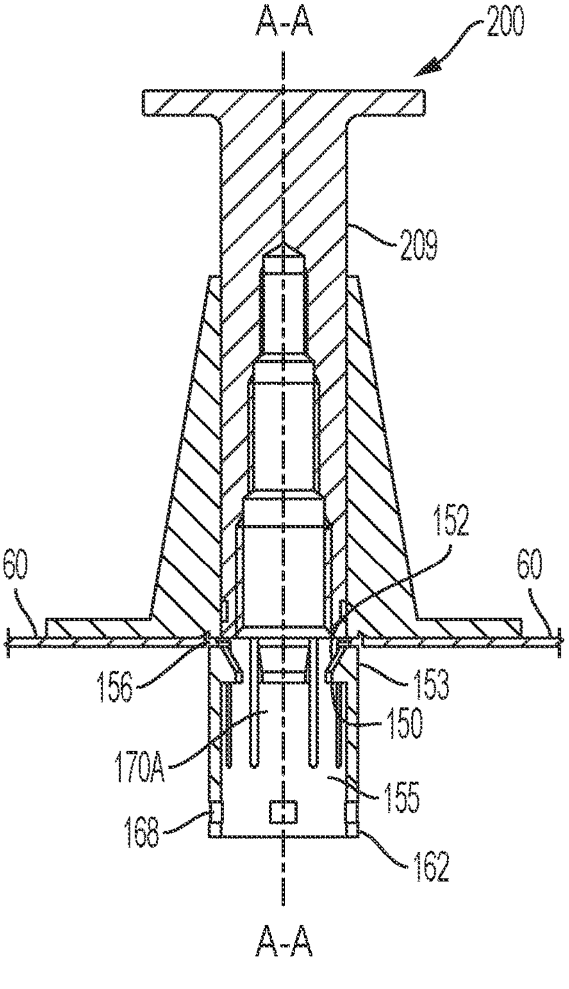
FIG. 1H shows a side cross-sectional view of an anchor housing installed in the anchor support of FIG. 1A in an unexpanded configuration.

Lower portion 160 may also include a plurality of slots 164A, 164B, defining a finger(s) 170A, 170B therebetween (see FIGS. 1D, 1E and 1H). Fingers 170 may be cantilevered and include a free end 153 and a fixed end 155. Free end 153 may be disposed at or along a longitudinal position between fixed end 155 and flange 134. In other words, finger 170 may be formed from a part of wall 160 and extend from a fixed end 155 with a fee 153 end extending or projecting toward flange 134. A free end 153 of finger 170 may include a tapered projection 150 thereon. Tapered projection 150 may include a taper surface 152 that extends toward a central axis A-A in a direction from free end 153 to fixed end 155. A gap 156 between a tip of finger 170 and a lower portion of flange 134 is at least lightly larger than a thickness of metal decking 60.

As mentioned above, upper portion 130 includes a receptacle 133. Receptacle 133 defines an inner wall surface 131 around central axis A-A. Tapered surface 152 projects radially inward past inner wall surface 131 and toward central axis A-A. FIGS. 1D and 1E show first and second side views of the anchor support of FIG. 1A now including an anchor housing 200 inserted into receptacle 133 of anchor support 100. Anchor housing 200 may be made of metal or other high strength material capable of supporting significant external load attached to the slab to be formed. Anchor housing 200 also includes a well know flange 202 for transferring load from the external load to the concrete. As mentioned above, extending from flange 202 is a shaft 212 that includes a connection member 205, 206 (e.g., a female metal thread). An external surface 209 of shaft 212 may engage inner wall surface 131 of upper portion 130 of anchor support 100 (see FIG. 1I).

Anchor housing 200 and anchor support 100 may be connected by manipulable friction fit between surfaces 209 and 131 to avoid easy separation. This manipulable friction fit allows shaft 212 of anchor housing 200 to be inserted into upper portion 130, through flange 134 and into recess 163 of lower portion 160.

FIGS. 1J-1M show anchor assembly 50 including a passage extension 300. Passage extension 300 may be tubular and is selectively connectable to a lower end 162 of lower portion 160. Specifically, passage extension 300 may include connectors 310 (e.g., openings or projections) for selectively engaging with the other of openings or projections 168 of the lower portion 160 of anchor support 160. The engagement of the openings of one with the projections of the other enable selective connection therebetween.

Figure 1I:
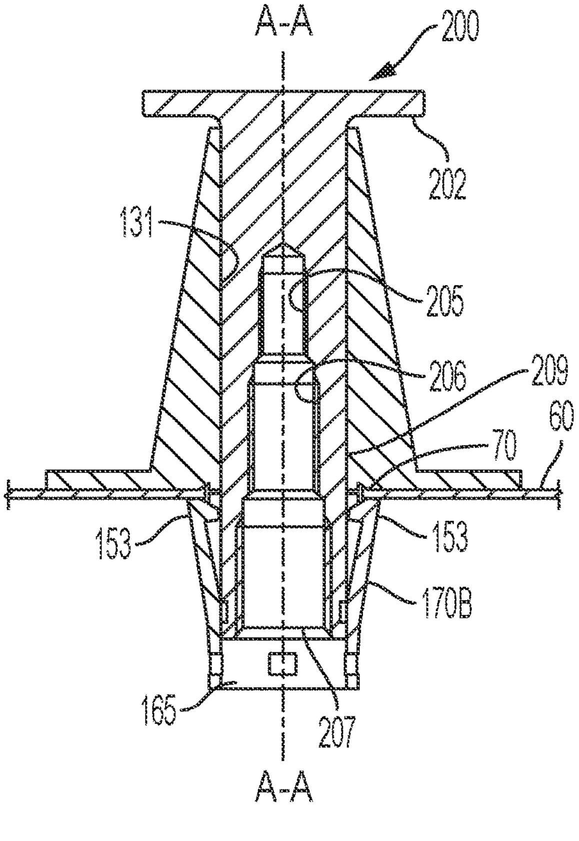
FIG. 1I shows a side cross-sectional view of an anchor housing installed in the anchor support of FIG. 1A in an expanded configuration.
Figure 1J:
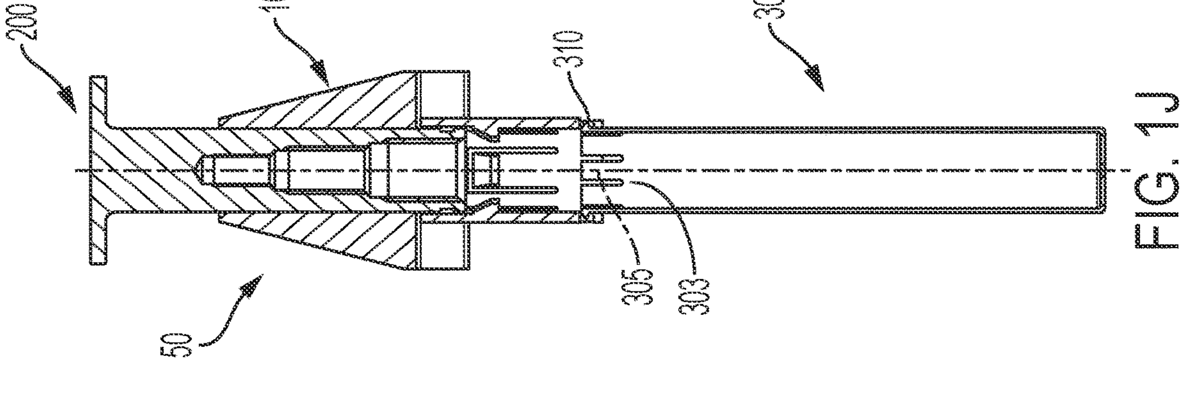
FIG. 1J shows a first side view in partial cross-section of an anchor assembly including the anchor support of FIG. 1A, the anchor housing of FIG. 1B and an extension passage.
Figure 1K:
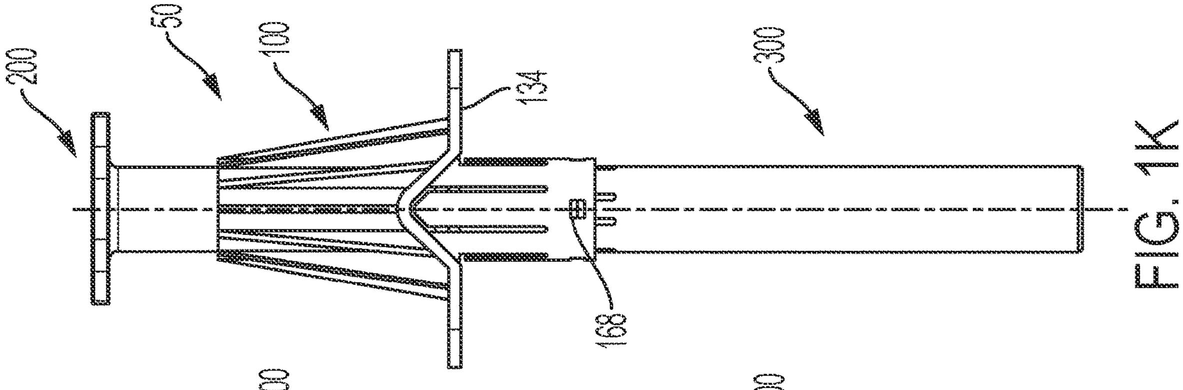
FIG. 1K shows a first side view of an anchor assembly including the anchor support of FIG. 1A, the anchor housing of FIG. 1B and an extension passage.
Figure 1L:
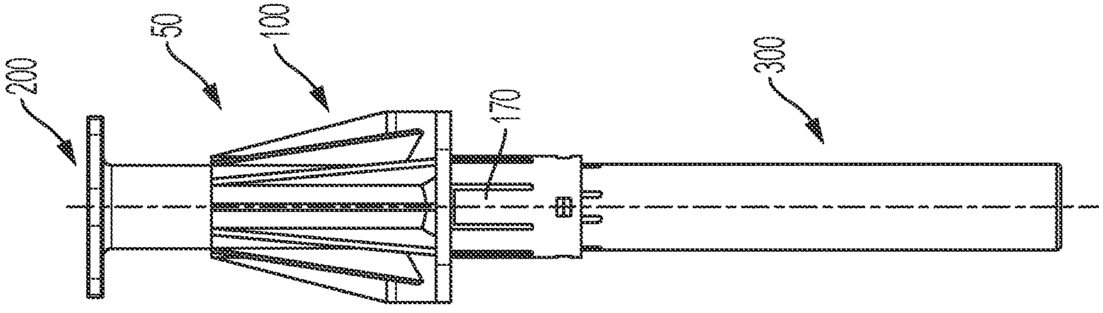
FIG. 1L shows a second side view of an anchor assembly including the anchor support of FIG. 1A, the anchor housing of FIG. 1B and an extension passage.
Figure 1M:
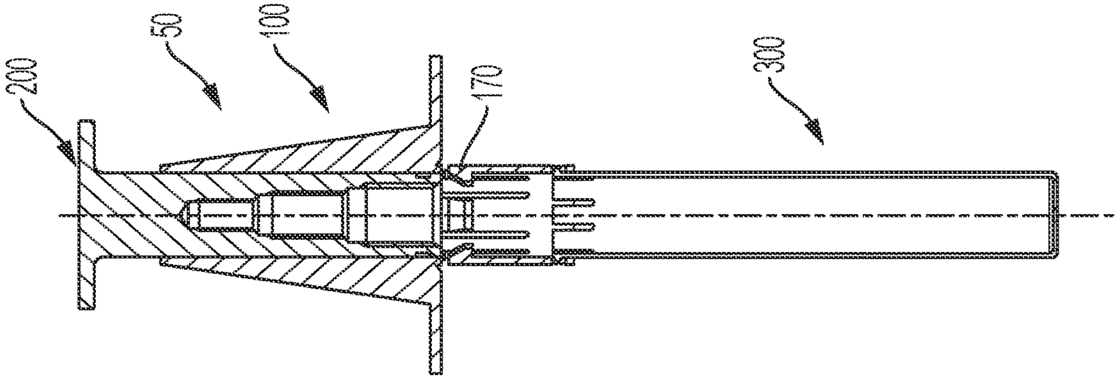
FIG. 1M shows a second side view in partial cross-section of an anchor assembly including the anchor support of FIG. 1A, the anchor housing of FIG. 1B and an extension passage.

FIG. 1H and FIG. 1I show two respective configurations of anchor assembly 50 with anchor housing 200 installed in anchor support 100. In a first configuration a lower portion of shaft 212 is inserted into anchor support 100, but not so far in as to engage tapered surface 152. In a second configuration, a lowermost portion of shaft 212 of anchor support 200 is inserted into anchor support 100 past flange 134 and into engagement with and past tapered surface 152. The engagement of the lower end of shaft 212 with tapered surface 152 forces free end 153 of cantilevered finger 170 to flex radially outward away from central axis A-A. Specifically, as shown in FIG. 1I, the outermost portion of free end 150 of finger 170 flexes radially out past inner wall surface 131 and out past a radial extent of hole 70 in metal decking 60. As a result, metal 60 decking becomes trapped between a tip of the free end 153 of finger 170 and a lower contact surface of flange 134. Said another way, in the second configuration, shaft 212 forces fingers 170 sufficiently radially outward to lock anchor support 200 into and onto the hole in the decking.

In use, an installer identifies a location where an anchor assembly 50 is to be installed. The installer then creates a hole 70 at that location (e.g., by drilling). The installer then inserts lower portion 160 into hole 70 until lower surface 140 of flange 134 engages the upper surface of metal decking 60. An anchor housing 200 may already be inserted into recess 133 as described in the first unactuated finger configuration above (see FIG. 1H). The anchor assembly 50 may then be reconfigured to the second configuration by urging (e.g., stepping on, stomping on, tapping with a hammer, etc.) shaft 212 of anchor housing 200 toward, against and past tapered portion 152 causing free ends 153 of fingers 170 to expand radially outward past a radial extend of hole 70 in the metal decking 60. Finger 170 may be referred to herein as a radial expansion member. The installer may then check to see if assembly 50 is locked to the hole by tugging a little on anchor support 50. To remove and reposition the anchor support, the installer need merely pull anchor housing 200 back out of anchor housing 100 to allow fingers 170 to flex back inward to a radial extend equal to or smaller than the hole.

Figure 2A:
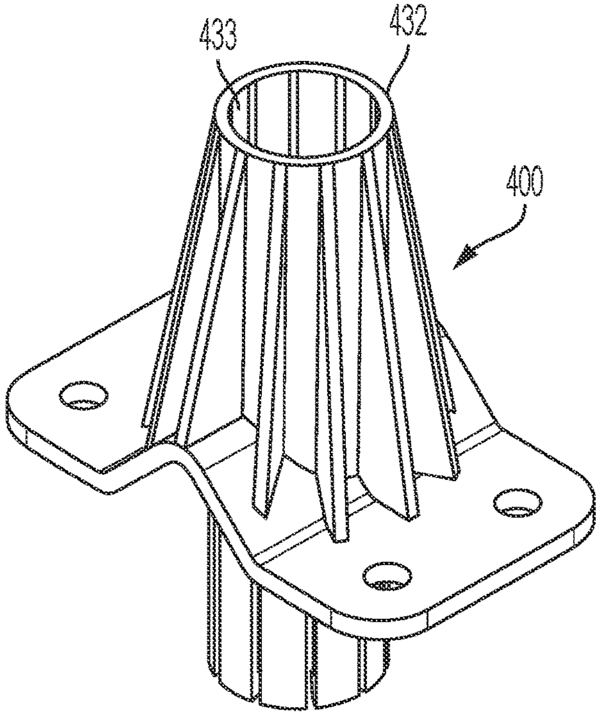
FIG. 2A shows a top perspective view of a second embodiment of an anchor support of the present invention.
Figure 2B:
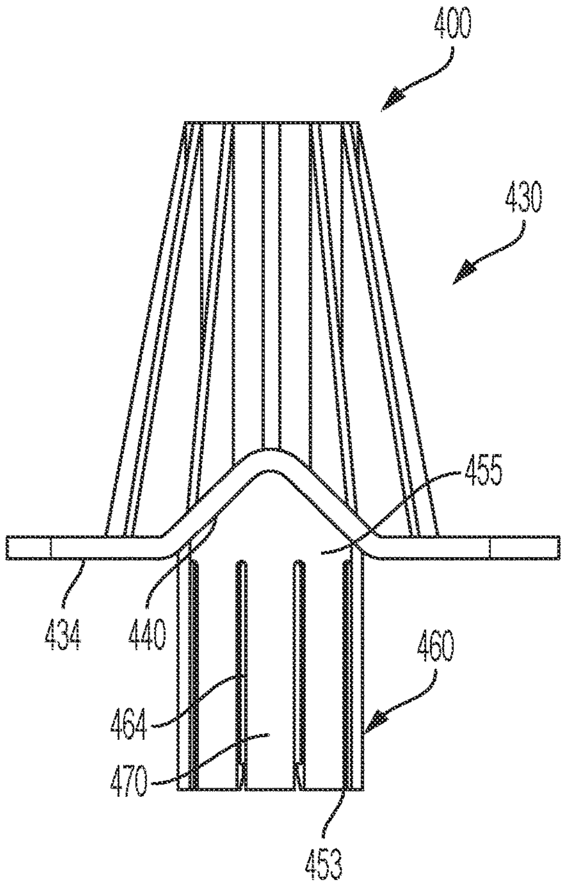
FIG. 2B shows a side view of the anchor support of FIG. 2A.
Figure 2C:
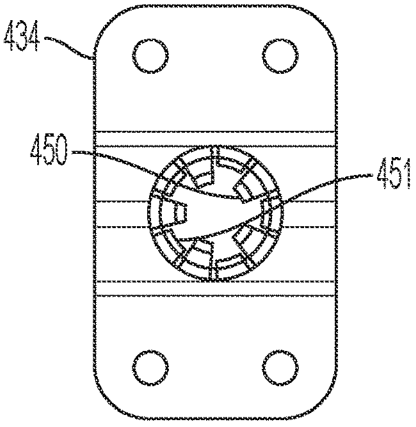
FIG. 2C shows a bottom view of the anchor support of FIG. 2A.
Figure 2D:
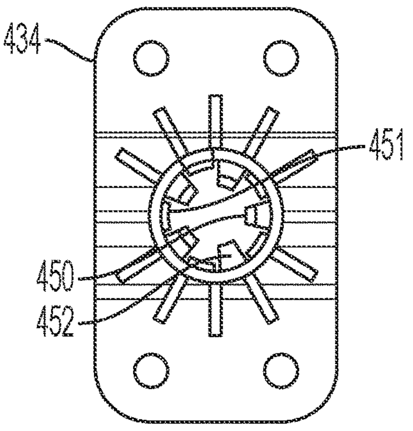
FIG. 2D shows a top view of the anchor support of FIG. 2A.
Figure 2E:
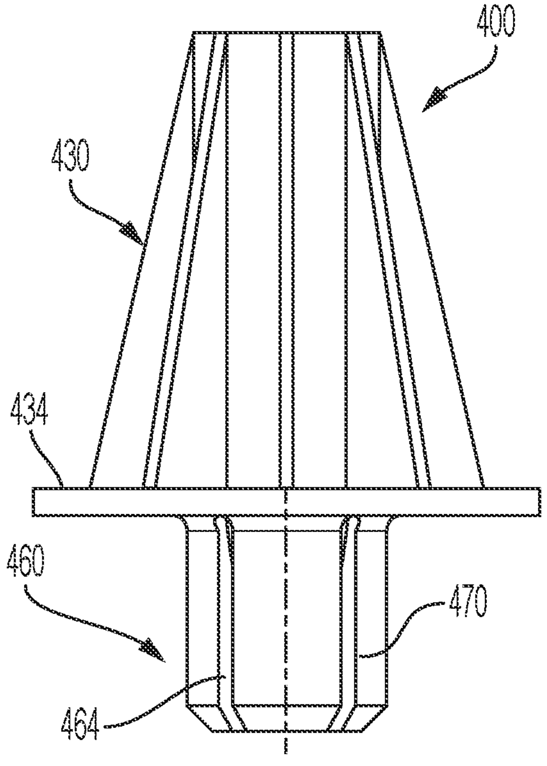
FIG. 2E shows a side view of the anchor support of FIG. 2A.
Figure 2F:
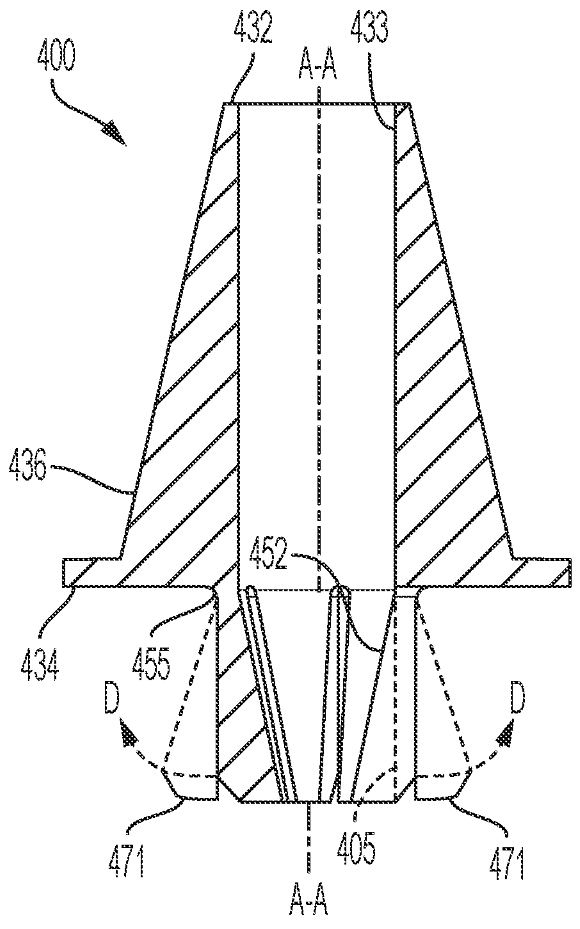
FIG. 2F shows a side cross-sectional side view of the anchor support of FIG. 2A.
Figure 2J:
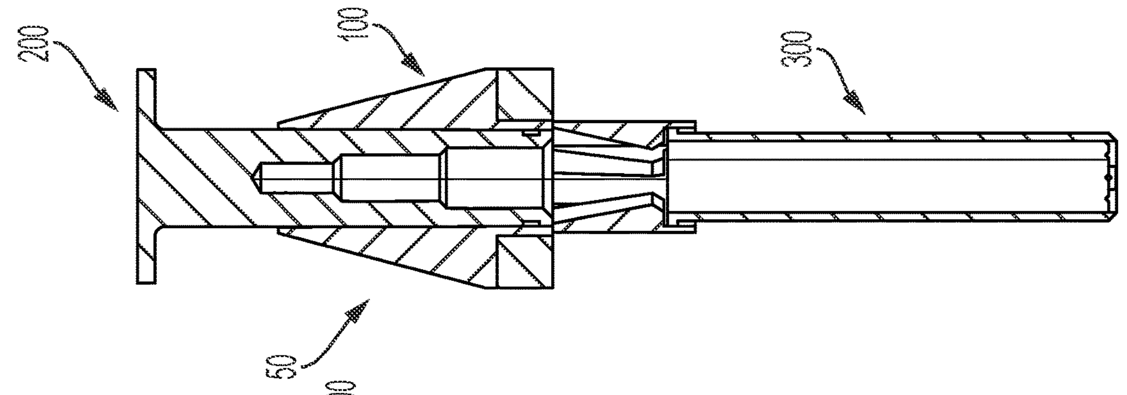
FIG. 2J shows a partial cross-section of the anchor assembly of FIG. 2I.
Figure 2I:
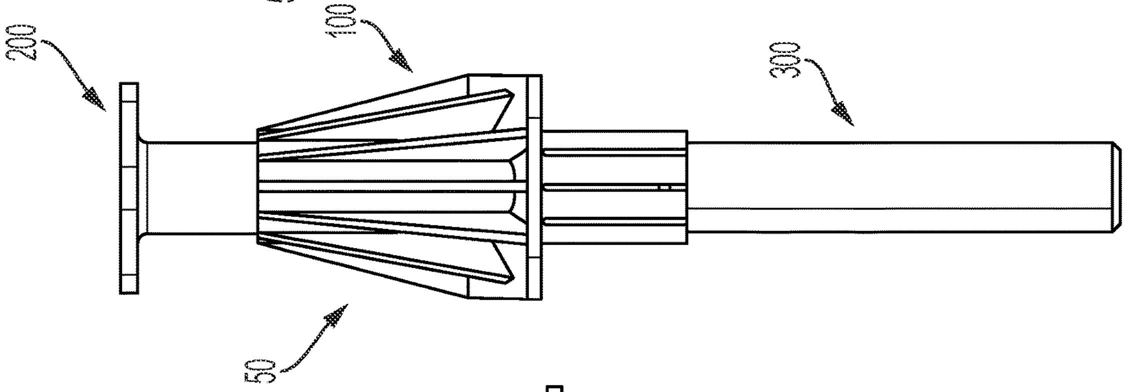
FIG. 2I shows a second side view of an anchor assembly including the anchor support of FIG. 1A, the anchor housing of FIG. 1B and an extension passage.
Figure 2H:
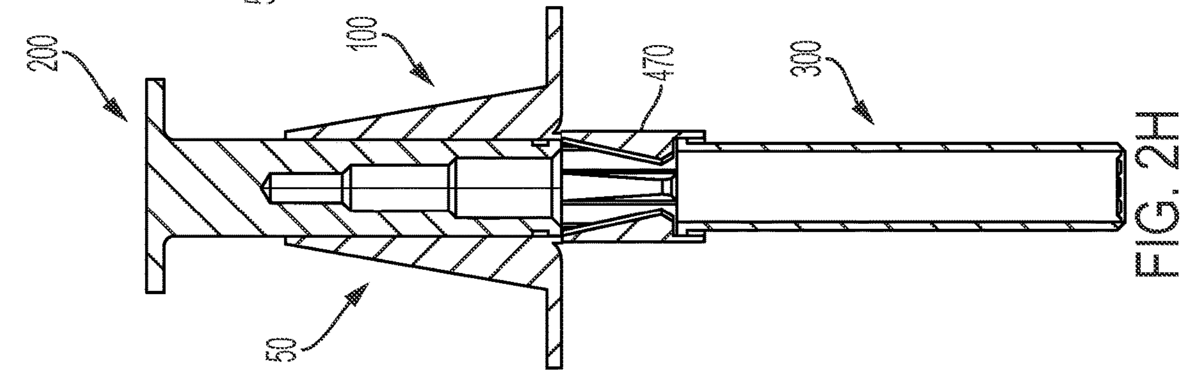
FIG. 2H shows a partial cross-section of the anchor assembly of FIG. 2G.
Figure 2G:
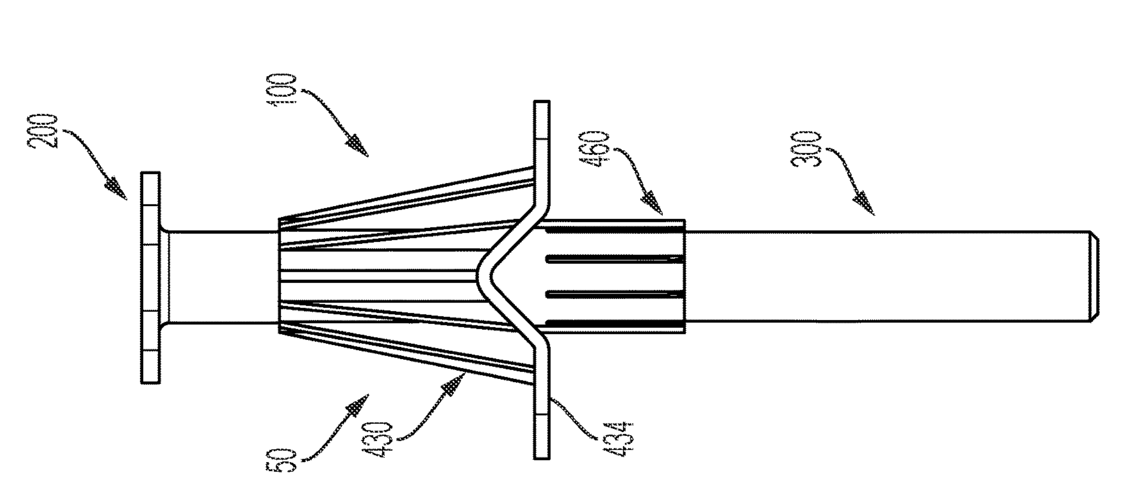
FIG. 2G shows a first side view of an anchor assembly including the anchor support of FIG. 2A, the anchor housing of FIG. 1B and an extension passage.

FIGS. 2A-2H show a second embodiment of an anchor support 400 of the present invention. The second embodiment of an anchor support 400 of anchor assembly 50 is similar to the first and third embodiments in structure and reconfiguration and parts are mostly interchangeable. Reference numerals begin with "4" in the 400 hundred series, but the first two digits of the reference number align with numbers from the first embodiment where possible. FIG. 2A shows a top perspective view of a second embodiment of anchor support 400 of the present invention. FIG. 2B shows a side view of the anchor support 400 of FIG. 2A. FIGS. 2C and 2D show top and bottom views of the anchor support 400 of FIG. 2A. FIG. 2B show a plurality of slots 464 defining fingers 470. An uppermost end 455 of fingers 470 is fixed and a lower most 453 is free so that finger 470 is cantilevered from fixed end 455. A radially inner portion of lower end 453 includes a tapered portion 450 with a tapered surface 452. Tapered surface 452 tapers toward a central longitudinal axis in a direction from fixed end 455 to free end 453. In use, and similar to the reconfiguration described above in the first embodiment, an anchor housing 200 is inserted into the receptacle 435 until a lower portion of shaft 212 engages tapered surface(s) 452 forcing fingers 470 outward so that a radially outward extent of fingers 470 is radially outward of a radial extent of the metal decking hole through which lower portion 460 was passed. Fingers 470 flex outward in a direction 471 which is direction D in the drawings relative to an living hinge near flange 434. Additional inward projections 451 may also be added to an inner receptacle surface 465. Projections 451 may extend inward to engage shaft 212 (e.g., at a groove in shaft 212) to indicate to a user during insertion of shaft 212 that a satisfactory extent of insertion has been achieved (e.g., insertion to the above-described full configuration or insertion to above-described second configuration).

Figure 3A:
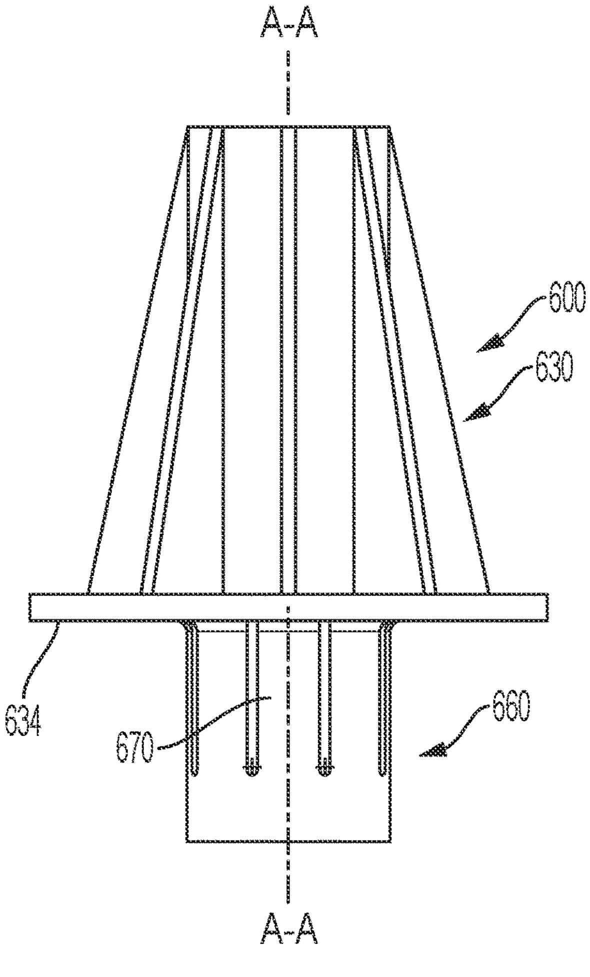
FIG. 3A shows a side view of a third embodiment of an anchor support of the present invention.
Figure 3B:
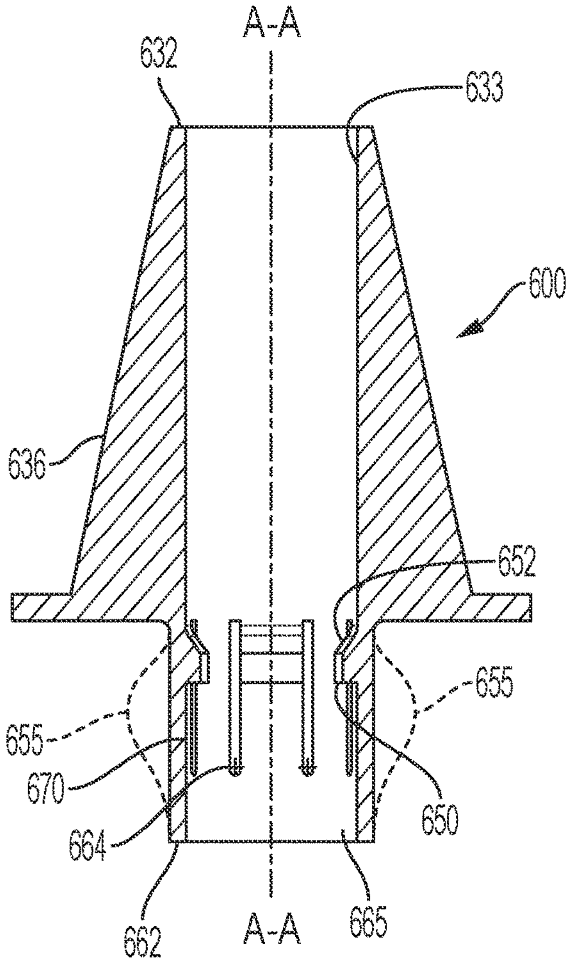
FIG. 3B shows a cross sectional view of the anchor support of FIG. 3A.

FIGS. 3A and 3B show a third embodiment of an anchor support 600 of the present invention. The third embodiment of the anchor assembly 50 is similar to the first and second embodiment in structure and reconfiguration and parts are interchangeable. The exception is that fingers 670, defined by slots 664 are attached at upper and lower ends. In other words, insertion of anchor housing 200 into receptacle 633 and down into engagement with tapered surface 652 of tapered projection 650 creates a radially outward bulge or buckling 655 of wall 662 such that a portion of finger 670 extends radially out past a radial extent of the hole in the metal decking. This radial expansion of the bulge prevents anchor support 600 from being removed after actuation into the second configuration. A threaded rod may now be inserted into passage 665 of anchor support 100.

What is claimed is:

1. A cast-in-place concrete anchor assembly connectable to a hole in concrete metal decking, the assembly for supporting an external load from a concrete structure, the assembly comprising:

an anchor housing, the anchor housing including a load bearing flange and a connection member from which an external load may be connected to the cast-in-place concrete anchor assembly;

an anchor support for telescopically receiving the anchor housing therein, the anchor support further including a base support flange and a radial expansion member;

wherein the radial expansion member being radially expandable from a first configuration wherein a radial extend of the radial expansion member is equal to or smaller than the hole to a second configuration wherein a radial extend of the radial expansion member is past a radial extend of the hole;

wherein in the first configuration, the anchor housing is received in the anchor support a first distance such that the anchor housing is not engaged with the radial expansion member, wherein in the second configuration the anchor housing is received in the anchor support a second distance greater than the first distance such that the anchor housing engages the radial expansion member, forcing the radial expansion member radially outward from the first configuration to the second configuration to lock the assembly to the hole by trapping the hole between the base support flange and the radial expansion member; and wherein the anchor housing is movable back to the first configuration to allow the radial expansion member to flex back radially inward for allowing the anchor housing to be removed from the hole.

2. The cast-in-place concrete anchor of claim 1, wherein the radial expansion member flexes by means of an elastic or flexible material.

3. The cast-in-place concrete anchor of claim 1, wherein the anchor housing is made of metal.

4. The cast-in-place concrete anchor of claim 1, wherein the anchor housing is made of metal and the anchor support is made of a non-metallic material.

5. The cast-in-place concrete anchor of claim 1, wherein the anchor housing is made of metal and the anchor support is made of a plastic.

6. The cast-in-place concrete anchor of claim 1, wherein the radial expansion member is in the form of at least one finger, the at least one finger being flexible radially outward in response to insertion of the anchor housing into the anchor support.

7. The cast-in-place concrete anchor of claim 6, wherein the at least one finger is cantilevered and has a fixed end and a free end and the anchor housing urges the free end radially outward.

8. The cast-in-place concrete anchor of claim 1, wherein the radial expansion member includes a ramped surface that is inclined inward toward a central axis of the anchor support.

9. The cast-in-place concrete anchor of claim 8, wherein the incline toward the central axis is in a direction away from the load bearing flange.

* * * * *